United States Patent [19]

Roskott et al.

[11] 4,306,038
[45] Dec. 15, 1981

[54] CURABLE MOLDING OR COATING COMPOUNDS

[75] Inventors: Lodewijk Roskott, Gorssel; Arnoldus A. M. Groenendaal, Vorden, both of Netherlands

[73] Assignee: Akzona Incorporated, Asheville, N.C.

[21] Appl. No.: 62,644

[22] Filed: Aug. 1, 1979

Related U.S. Application Data

[63] Continuation of Ser. No. 896,543, Apr. 14, 1978, abandoned.

[30] Foreign Application Priority Data

Apr. 19, 1977 [NL] Netherlands ......................... 7704241

[51] Int. Cl.$^3$ ........................... C03K 5/09; C03K 5/56
[52] U.S. Cl. ......................................... 525/4; 525/5; 525/11; 525/13; 525/21; 525/27
[58] Field of Search ...................... 525/4, 5, 11, 13, 27, 525/21

[56] References Cited

U.S. PATENT DOCUMENTS 3,449,276  6/1969  Rabenold et al. ................... 525/245
3,594,439  7/1971  Baker .................................. 525/17
3,652,718  3/1972  Abrahami et al. .................. 525/14
3,988,290  10/1976  Uffner ............................... 525/17

OTHER PUBLICATIONS

C. A. (Chem. Abst.) 77:165875v; 77:7031j; 7th Dec. Index 5197s; 5199s & 5208s; 83:79743q; 71:30962y.
B. Parkyn; *Polyesters,* II, Iliffe Books Ltd; pp. 51-61, 1965.
Rolczynski et al., "Activated Decomposition of Organic Peroxides in Unsaturated Polyester Resins"; Section 16-A, pp. 1-8 (1969; 24th Annual Technical Conference).

*Primary Examiner*—J. Ziegler
*Attorney, Agent, or Firm*—Francis W. Young; Robert F. Green

[57] ABSTRACT

A process for the preparation of a curable molding or coating compound containing an unsaturated polyester resin is disclosed. The process comprises substantially uniformly incorporating into said resin effective amounts of a cerium promoter and a catalytically active tertiary butyl peroxy ester or a tertiary amyl peroxy ester of a non-α-branched aliphatic or aromatic, mono- or dicarboxylic acid.

10 Claims, No Drawings

CURABLE MOLDING OR COATING COMPOUNDS

This is a continuation of application Ser. No. 896,543, filed Apr. 14, 1978, abandoned.

BACKGROUND OF THE INVENTION

This invention relates to a process for the preparation of a curable molding or coating compound containing an unsaturated polyester resin. This invention also relates to a process for curing an unsaturated polyester resin and to curable molding or coating compounds.

It has been well known that molding or coating compounds containing polyester resins may be cured by means of an organic peroxide initiator and a promoter. In U.S. Pat. No. 3,988,290 it is recommended that for purposes of curing such compounds one should utilize a combination of a cobalt promotor in which the cobalt ion is in the valency III and a peroxide, a hydroperoxide, or a peroxy ester initiator. Cobalt promoters, however, have the disadvantage that they may have detrimental effects on the color of the resulting end product.

SUMMARY OF THE INVENTION

A process for the preparation of a curable molding or coating compound containing an unsaturated polyester resin has now been discovered. The process comprises substantially uniformly incorporated into said resin effective amounts of a cerium promoter and a catalytically active tertiary butyl peroxy ester or a tertiary amyl peroxy ester of a non-$\alpha$-branched, aliphatic or aromatic, mono- or dicarboxylic acid.

Also discovered has been a process for curing an unsaturated polyester resin comprising compressing and heating said resin to a temperature effective to cure the polyester, in the presence of effective amounts of a cerium promoter and a catalytically active tertiary butyl peroxy ester or a tertiary amyl peroxy ester of a non-$\alpha$-branched, aliphatic or aromatic, mono- or dicarboxylic acid.

Furthermore, a curable molding or coating compound has been discovered. The compound comprises an unsaturated polyester resin having substantially uniformly incorporated therein effective amounts of a cerium promoter and a catalytically active tertiary butyl peroxy ester or a tertiary amyl peroxy ester of a non-$\alpha$-branched, aliphatic or aromatic, mono- or dicarboxylic acid.

DETAILED DESCRIPTION OF THE PREFERRED EMBODIMENTS

As indicated, the present invention is useful with unsaturated polyester resins. As utilized in the application the term "unsaturated polyester resin" refers to solutions of unsaturated polyesters in reactive monomers containing one or more polymerizable $CH_2=C<$- groups such as styrene, vinyl toluene, methyl methacrylate, diallyl phthalate, and divinyl benzene. The unsaturated polyester and the copolymerizable monomer may be present in the unsaturated resin in various amounts. Typically, however, the resin comprises from about 30 to about 50%, by weight, of the monomer and about 70 to about 50%, by weight, of unsaturated polyester.

The unsaturated polyester resin useful in the practice of the present invention may be any unsaturated polyester. Typically, unsaturated polyester resins are obtained by reacting approximately equivalent amounts of a polyvalent alcohol, such as ethylene glycol, propylene glycol, or diethylene glycol, with an unsaturated dibasic carboxylic acid, such as maleic acid, fumaric acid, or itaconic acid, in the presence, if desired, of a saturated acid, such as phthalic acid, isophthalic acid, tetrachlorophthalic acid, malonic acid, adipic acid, sebacic acid, or the like.

The unsaturated polyester resins which are useful as molding or coating compounds desirably contain thickeners, more particularly chemical thickeners, such as magnesium oxide and hydroxide, or oxides or hydroxides of other metals of group II of the periodic system. Such thickeners are typically added in amounts from about 0.5 to about 25 parts, preferably from about 1 to about 5 parts, per 100 parts of unsaturated polyester resin.

Also incorporated into the unsaturated polyester resin may be lubricants, such as zinc stearate, or polyethylene, and fillers, such as calcium carbonate, clay, and pigments such as titanium dioxide, ferric oxide, or zinc oxide, and low shrink additives, such as polyvinyl acetate, or other thermoplastic materials, and reinforcing agents such as glass fibers.

As indicated, the peroxy esters which are useful in the practice of the present invention are tertiary butyl or tertiary amyl peroxy estrs of non-$\alpha$-branched, aliphatic or aromatic, mono- or dicarboxylic acids. Examples of typical peroxy esters which may be utilized in accordance with the present invention include tertiary butyl peroxy acetate, ditertiary butyl peroxy glutarate, ditertiary butyl peroxy succinate, tertiary butyl peroxy-3,5,5-trimethyl hexanoate, and tertiary butyl peroxy benzoate.

As indicated, any tertiary butyl or tertiary amyl peroxy ester derived from a non-$\alpha$-branched, aliphatic or aromatic, mono- or dicarboxylic acid may be utilized, so long as it is catalytically active. Preferably, if the perester is aliphatic in nature, it will contain in the aliphatic residue thereof from about 2 to about 18 carbon atoms, most preferably from about 2 to about 12 carbon atoms. If the peroxy ester is aromatic in nature, the aromatic residue thereof will preferably contain from about 7 to about 18 carbon atoms, most preferably from about 7 to about 10 carbon atoms.

The peroxy esters may be incorporated into the polyester resin in any manner desired. Typically, one may incorporate the peroxy esters into the polyester resin directly, as a solution in, for example, a plasticizer, or by mixing with an inert filler which will be subsequently added to the unsaturated polyester molding or coating compound.

The peroxy esters are incorporated into the unsaturated polyester resins in amounts which are effective to cure the polyester resin, in the presence of the cerium promoter. Typically, calculated on the total weight of the unsaturated polyester resin, the peroxy esters are utilized in an amount from about 0.1 to about 5%, by weight, most preferably in amounts from about 0.2 to about 2%, by weight.

Generally, any cerium promoter may be utilized in the practice of the present invention. Suitable cerium promoters include cerium salts of inorganic acids such as chlorides, nitrates, or sulphates; cerium carboxylates, such as cerium-2-ethyl hexanoate, or cerium-3,5,5-trimethyl hexanoate, or cerium naphthenate; or cerium compounds derived from -diketones, such as cerium acetyl acetonate. Also useful as cerium promoters are salts and complex compounds derived from cerium rich rare earths.

As indicated, the cerium promoter is utilized in an amount effective to promote the decomposition of the peroxy ester. The amount of cerium promoter to be utilized is dependent on the nature and the amount of the peroxy ester. Typically, the amount to be utilized will be in the range of from about 0.005 to about 0.25%, by weight, calculated as metal, based on the total weight of the unsaturated polyester resin.

The cerium promoter to be utilized in accordance with the present invention may, together with other additives, be added to the unsaturated polyester resin in any order desired. Advantageously, however, the cerium promoter is separately added to the unsaturated polyester resin. It has been found that a composition derived from an unsaturated polyester resin and a cerium promoter in accordance with the present invention is sufficiently tenable to be made commercially available as such. The promoter may be incorporated into the resin, as such, or in the form of a solution in styrene, α-methyl styrene, xylene, toluene, alcohols, ketones, or chlorinated hydrocarbons. Typically, such solutions contain from about 0.5 to about 10%, by weight, of cerum, as metal, preferably from about 1 to about 3%, by weight, of cerium, as metal.

The unsaturated polyester resin containing the peroxy ester/cerium promoter may be cured under typical molding conditions. The exact temperature and pressure will vary, depending upon the particular resin utilized, but generally the temperature will range from about 120° to about 170° C. and the pressure is generally in the range from about 50 to about 150 kg/cm$^2$.

It has been surprisingly found that the use of the peroxy ester/cerium promoter combination, in accordance with the present invention, in the compression molding of the described molding or coating compounds, has been found to result in end product resin molding or coating layers having a very low residual monomer content and a very good gloss.

The present invention will be further described by the following non-limiting examples. The term "standard resin" utilized in the following examples is meant to mean a commercial product prepared from 1.2 moles of moleic anhydride, 1.0 moles of phthalic anhydride, 1.0 moles of diethylene glycol, and 1.3 moles of propane-1,2-diol, diluted with about 30%, by weight, of styrene. To stabilize the product 0.01%, by weight, of hydroquinone and 0.01%, by weight, of para-tertiary-butyl catechol have been incorporated into the standard resin which has an acid number of 30 and a viscosity st 20° C. of 2400 centipoise.

To determine the flow of the molding compounds, 5 grams of the standard resin were placed between two flat plates and, over a period of 60 seconds, subjected to a load of 10 kg/cm$^2$ at a temperature of 140° C. or 100° C. The resulting diameter of the compound is a measure of the flow.

The gloss of the resulting products was determined in accordance with DIN 67530, at an angle of reflection of 45°. The residual styrene content was determined in accordance with DIN 16945.

EXAMPLE I

To a molding compound of the following composition:

| | |
|---|---|
| standard resin | 30.5 parts by weight |
| styrene | 2.5 parts by weight |
| zinc stearate | 0.5 parts by weight |
| calcium carbonate | 46.0 parts by weight |
| magnesium oxide | 0.5 parts by weight |
| glass fibers, 6 mm long | 20.0 parts by weight | contained ina Z-blade mixer, there were added, at 20° C., 0.30 parts, by weight, of a solution in xylene of cerium (as rare earths) -2-ethyl hexanoate, which solution contained 1% cerium metal, and subsequently 0.30 parts, by weight, of tertiary butyl peroxy benzoate. The compound was thickened by leaving it at room temperature for 3 days and the flow was determined at 140° C.

In a steel mold the compound was compressed into a molding over a period of 60 seconds at a temperature of 140° C. and a pressure of 100 kg/cm$^2$. From the molding thus obtained. the gloss and the residual styrene content were determined. Corresponding measurements were carried out on moldings obtained with the use of larger amounts of promoter and/or longer molding times and/or other peroxy esters, some of which contained α-branching for purposes of comparison. Table A shows the peroxy esters used, the amounts of promoter, the compression molding times, and the results obtained.

TABLE A

| Tertiary butyl | Promoter % by wt. | Molding time (in sec.) | Flow (in cm) | Residual styrene content % by wt. | Gloss |
|---|---|---|---|---|---|
| peroxy benzoate | — | 90 | 16.48 | 0.94 | 13 |
| | 0.01 | 90 | 16.38 | 0.49 | 16 |
| | 0.02 | 90 | 16.82 | 0.23 | 21 |
| | 0.03 | 90 | 17.23 | 0.18 | 28 |
| | — | 120 | 16.48 | 0.74 | 21 |
| | 0.01 | 120 | 16.38 | 0.26 | 23 |
| | 0.02 | 120 | 17.23 | 0.07 | 34 |
| | — | 180 | 16.48 | 0.43 | 23 |
| | 0.01 | 180 | 16.38 | 0.06 | 26 |
| | 0.02 | 180 | 16.82 | 0.02 | 30 |
| | 0.03 | 180 | 17.23 | 0.01 | 36 |
| peroxy acetate | — | 90 | 16.23 | 0.24 | 20 |
| | 0.01 | 90 | 16.34 | 0.16 | 28 |
| | 0.02 | 90 | 16.80 | 0.10 | 29 |
| | 0.03 | 90 | 17.12 | 0.09 | 33 |
| | — | 120 | 16.23 | 0.15 | 24 |
| | 0.01 | 120 | 16.34 | 0.05 | 30 |
| | 0.02 | 120 | 16.80 | 0.03 | 30 |
| | 0.03 | 120 | 17.12 | 0.01 | 33 |
| | — | 180 | 16.23 | 0.05 | 25 |
| | 0.01 | 180 | 16.34 | 0.01 | 31 |
| | 0.02 | 180 | 16.80 | 0.01 | 37 |
| | 0.03 | 180 | 17.12 | 0.00 | 37 |
| peroxy-3,5,5-tri-methyl hexanoate | — | 90 | 16.38 | 0.07 | 18 |
| | 0.01 | 90 | 16.34 | 0.32 | 20 |
| | 0.02 | 90 | 16.50 | 0.28 | 24 |
| | 0.03 | 90 | 16.55 | 0.24 | 28 |
| | — | 120 | 16.38 | 0.47 | 20 |
| | 0.01 | 120 | 16.34 | 0.28 | 23 |
| | 0.02 | 120 | 16.50 | 0.16 | 27 |
| | 0.03 | 120 | 16.55 | 0.07 | 30 |
| | — | 180 | 16.38 | 0.29 | 22 |
| | 0.01 | 180 | 16.34 | 0.11 | 28 |
| | 0.02 | 180 | 16.50 | 0.06 | 31 |
| | 0.03 | 180 | 16.55 | 0.01 | 36 |
| peroxy-2 ethyl hexanoate (α-branched) | — | 30 | 12.03 | 0.29 | 38 |
| | 0.01 | 30 | 11.90 | 0.30 | 37 |
| | 0.02 | 30 | 12.01 | 0.28 | 39 |
| | 0.03 | 30 | 11.98 | 0.31 | 38 |
| | — | 60 | 12.03 | 0.28 | 44 |
| | 0.01 | 60 | 11.90 | 0.26 | 43 |
| | 0.02 | 60 | 12.01 | 0.28 | 45 |
| | 0.03 | 60 | 11.98 | 0.30 | 45 |
| | — | 120 | 12.03 | 0.23 | 46 |

TABLE A-continued

| Tertiary butyl | Promoter % by wt. | Molding time (in sec.) | Flow (in cm) | Residual styrene content % by wt. | Gloss |
| --- | --- | --- | --- | --- | --- |
| | — | 120 | 11.90 | 0.33 | 45 |
| | 0.01 | 120 | 12.01 | 0.24 | 40 |
| | 0.02 | 120 | 11.98 | 0.23 | 45 |
| peroxy | 0.03 | 30 | 10.31 | 0.38 | 37 |
| di-ethyl | 0.01 | 30 | 10.30 | 0.42 | 36 |
| acetate | 0.02 | 30 | 10.56 | 0.39 | 37 |
| (α-branched) | 0.03 | 30 | 10.50 | 0.40 | 37 |
| | — | 60 | 10.31 | 0.27 | 45 |
| | 0.01 | 60 | 10.30 | 0.27 | 42 |
| | 0.02 | 60 | 10.56 | 0.38 | 44 |
| | 0.03 | 60 | 10.50 | 0.31 | 42 |
| | — | 120 | 10.31 | 0.20 | 40 |
| | 0.01 | 120 | 10.30 | 0.19 | 41 |
| | 0.02 | 120 | 10.56 | 0.19 | 39 |
| | 0.03 | 120 | 10.50 | 0.21 | 41 |
| peroxy | — | 60 | 10.99 | 0.19 | 28 |
| isobutyate | 0.01 | 60 | 11.00 | 0.19 | 30 |
| (α-branched) | 0.02 | 60 | 11.23 | 0.19 | 27 |
| | 0.03 | 60 | 11.14 | 0.21 | 30 |
| | — | 90 | 10.99 | 0.13 | 35 |
| | 0.01 | 90 | 11.00 | 0.13 | 32 |
| | 0.02 | 90 | 11.23 | 0.12 | 33 |
| | 0.03 | 90 | 11.14 | 0.15 | 36 |
| | — | 180 | 10.99 | 0.10 | 42 |
| | 0.01 | 180 | 11.00 | 0.09 | 41 |
| | 0.02 | 180 | 11.23 | 0.11 | 41 |
| | 0.03 | 180 | 11.14 | 0.09 | 42 |

From Table A it is apparent that the quality of the resulting cured polyesters increased when the non-α-branched peroxy esters were utilized in conjunction with a cerium promoter whereas the products cured with α-branched polyesters showed no improvement when cured in combination with a cerium promoter, the residual styrene and gloss remaining substantially unchanged.

EXAMPLE II

Use was made of a molding compound having low shrinkage and of the following composition:

| standard resin | 60.0 parts by weight |
| --- | --- |
| polyvinyl acetate | 16.0 parts by weight |
| styrene | 24.0 parts by weight |
| calcium carbonate | 150.0 parts by weight |
| zinc stearate | 1.5 parts by weight |
| magnesium oxide | 2.0 parts by weight |
| glass fibers, 6 mm long | 65.0 parts by weight |

The above compound was contained in a Z-blade mixer. At 20° C. there were added as rear earths -2-ethyl hexanoate, 0.006 parts by weight of cerium. Subsequently, there were added 0.6 parts by weight of tertiary butyl peroxy benzoate.

After the compound had been allowed to thicken for 3 days the flow was determined at a temperature of 150° C., after which the compound was compressed for 90 seconds in a steel mold at the same temperature and a pressure of 100 kg/cm$^2$. From the resulting molding the glass and the residual styrene content were determined. Corresponding measurements were carried out on moldings obtained using a larger amount of cerium and/or longer compression molding times.

The amounts of cerium used, the compression molding times, the measured flow, gloss and residual styrene content are listed in Table B.

TABLE B

| Tertiary butyl | Cerium metal % | Molding time (in sec.) | Flow (in cm) | Residual styrene content % by wt. | Gloss |
| --- | --- | --- | --- | --- | --- |
| peroxy benzoate | — | 90 | 13.8 | 0.96 | 53 |
| | 0.01 | 90 | 13.9 | 0.28 | 70 |
| | 0.02 | 90 | 14.1 | 0.17 | 79 |
| | 0.03 | 90 | 14.0 | 0.11 | 82 |
| | — | 150 | 13.8 | 0.50 | 69 |
| | 0.01 | 150 | 13.9 | 0.13 | 83 |
| | 0.02 | 150 | 14.1 | 0.10 | 82 |
| | 0.03 | 150 | 13.8 | 0.08 | 84 |

Table B shows that a dramatic improvement in the residual styrene and the gloss of the resulting cured polyesters may be achieved by utilizing tertiary butyl peroxy benzoate in combination with a cerium promoter.

EXAMPLE III

To a molding compound composed as described in Example I there were added 0.4%, by weight, of tertiary butyl peroxy-3,5,5-trimethyl hexanoate, calculated on the unsaturated polyester resin and subsequently, also calculated on the used resin, 0.01%, by weight, of cerium, as rare earths -2-ethyl hexanoate. To thicken the molding compound it was stored for 3 days at room temperature. From the compound the flow was determined at 140° C. and thereafter, at the same temperature and a pressure of 100 kg/cm$^2$, it was compression molded in a steel mold for 120 seconds. From the molding thus obtained the gloss and the residual styrene content were determined. Corresponding measurements were carried out on moldings prepared with the use of a larger amount of peroxide and/or promoter. The amounts of peroxide and cerium used, as well as the results obtained are listed hereinafter in Table C which shows the cured product has much less residual styrene when the peroxy ester is utilized in conjunction with the cerium promoter.

TABLE C

| Tertiary butyl peroxy-3,5,5-trimethyl hexanoate % by wt. | Cerium as metal % by wt. | Flow (in cm) | Residual styrene content % by wt. | Gloss |
| --- | --- | --- | --- | --- |
| 0.4 | — | 16.9 | 1.35 | 23 |
| 0.4 | 0.01 | 17.1 | 0.81 | 25 |
| 0.4 | 0.02 | 17.1 | 0.41 | 26 |
| 0.4 | 0.03 | 17.3 | 0.22 | 27 |
| 0.6 | — | 16.1 | 0.90 | 27 |
| 0.6 | 0.01 | 16.3 | 0.29 | 32 |
| 0.6 | 0.02 | 16.6 | 0.18 | 32 |
| 0.6 | 0.03 | 16.9 | 0.09 | 33 |
| 0.8 | — | 15.0 | 0.76 | 26 |
| 0.8 | 0.01 | 15.3 | 0.35 | 31 |
| 0.8 | 0.02 | 15.7 | 0.07 | 34 |
| 0.8 | 0.03 | 15.7 | 0.01 | 37 |
| 1.0 | — | 14.4 | 0.50 | 26 |
| 1.0 | 0.01 | 14.5 | 0.11 | 32 |
| 1.0 | 0.02 | 14.8 | 0.01 | 39 |

EXAMPLE IV

Use was made of a molding compound having low shrinkage and of the following composition:

| standard resin | 60.0 parts by weight |
| --- | --- |
| polyvinyl acetate | 16.0 parts by weight |

-continued

| | |
|---|---|
| styrene | 24.0 parts by weight |
| kaolin | 130.0 parts by weight |
| titanium dioxide (rutile) | 20.0 parts by weight |
| zinc stearate | 1.5 parts by weight |
| magnesium oxide | 2.0 parts by weight |
| glass fibers (6 mm long) | 65.0 parts by weight |

Calculated on the standard resin, there were added 0.05%, by weight, of di-tertiary-butyl peroxy terephthalate and 0.01%, by weight, of cerium, as rare earths -2-ethyl-hexanoate. After the compound had been allowed to thicken for 3 days at 20° C., it was, over a period of 120 seconds while in a steel metal mold, subjected to a pressure of 100 kg/cm at a temperature of 140° C. From the resulting molding the gloss and the residual styrene content were determined. Corresponding measurements were carried out on moldings prepared with the use of the same amount of other peroxides, some of which contained α-branching, for purposes of comparison. The amounts of peroxide and cerium and the compression molding times and measuring results are listed in Table D. Again, the resulting products which were cured with the non-α-branched peroxy esters showed less residual styrene when use was made of the cerium promoter whereas the cerium promoter showed no benefit when used with the α-branched peroxy esters.

TABLE D

| Peroxide | Cerium as metal % by wt. | Molding time (in sec.) | Residual styrene content % by wt. | Gloss |
|---|---|---|---|---|
| di-tertiary butyl peroxy terephthalate | 0.01 | 150 | 0.19 | 30 |
|  | — | 150 | 0.82 | 26 |
| di-tertiary butyl peroxy adipate | 0.01 | 120 | 0.21 | 32 |
|  | — | 120 | 0.94 | 20 |
| tertiary amyl peroxy 3,5,5-trimethyl hexanoate | 0.01 | 120 | 0.14 | 39 |
|  | — | 120 | 0.71 | 29 |
| di-tertiary butyl peroxy hexahydro terephthalate (α-branched) | 0.01 | 60 | 0.38 | 37 |
|  | — | 60 | 0.30 | 42 |
| di-tertiary butyl peroxy α,α,α¹,α¹ tetramethyl adipate (α-branched) | 0.01 | 60 | 1.01 | 38 |
|  | — | 60 | 0.92 | 38 |
| 2,4,4-trimethyl pentyl-2-peroxy-2-ethyl hexanoate (α-branched) | 0.01 | 30 | 0.11 | 60 |
|  | — | 30 | 0.08 | 62 |

EXAMPLE V

To a prepeg (sheet molding compound) of the following composition:

| | |
|---|---|
| standard resin | 65.0 parts by weight |
| polyvinyl acetate | 14.0 parts by weight |
| styrene | 21.0 parts by weight |
| calcium carbonate | 130.0 parts by weight |
| zinc stearate | 3.5 parts by weight |
| magnesium oxide | 1.0 parts by weight | there were added 0.5%, by weight, of tertiary butyl peroxy benzoate and subsequently 0.01%, by weight, of cerium as cerium 2-ethyl hexanote.

With the aid of an SMC machine the compound was impregnated with 25 mm-long glass fibers up to a content of 30%, by weight. After maturing at 25° C. the prepeg was compression molded at a temperature of 150° C. and a pressure of 125 kg/cm². In the present example the flow properties were determined in accordance with the French standard method: Afnor PrT 57-514. Of the moldings also the gloss and the residual styrene content were determined. Corresponding measurements were carried out on prepegs to which different amounts of peroxide and/or cerium had been added.

The results obtained and the amount of cerium and/or peroxide used are listed in TABLE E which shows the benefit of using the cerium promoter in combination with a non-α-branched peroxy ester, the cured products having lower residual styrene content.

TABLE E

| Tertiary butyl peroxy benzoate | Promoter % by wt. | Molding time (in sec.) | Flow (in cm) | Residual styrene content % by wt. | Gloss |
|---|---|---|---|---|---|
| 1.0 | — | 120 | 355 | 0.48 | 18 |
| 1.0 | — | 180 | 355 | 0.27 | 26 |
| 1.0 | 0.01 | 120 | 379 | 0.09 | 24 |
| 1.0 | 0.01 | 180 | 379 | 0.06 | 24 |
| 1.0 | 0.03 | 120 | 391 | 0.05 | 33 |
| 1.0 | 0.03 | 180 | 391 | 0.05 | 35 |
| 0.5 | — | 120 | 428 | 0.82 | 8 |
| 0.5 | — | 180 | 428 | 0.52 | 20 |
| 0.5 | 0.01 | 120 | 480 | 0.22 | 17 |
| 0.5 | 0.01 | 180 | 480 | 0.07 | 28 |
| 0.5 | 0.03 | 120 | 504 | 0.07 | 25 |
| 0.5 | 0.03 | 180 | 504 | 0.07 | 29 |

EXAMPLE VI

To the standard resin there were added 1%, by weight, of tertiary butyl peroxy benzoate and 0.03% cerium as rare earths -2-ethyl hexanoate. A 100-g pot was charged with the resin mixture, capped and thereafter stored in the dark at 30° C. The contents of the pot were checked daily for containing gel parts. The time elapsed from the moment the resin was shelved until the moment it was found to contain gel parts was referred to as pot life.

Corresponding measurements were carried out with tertiary butyl peroxy acetate to be used according to the invention, and other metal compounds proposed in the literature and in practice to be used as promoters. The results of the experiments are listed in Table F which show that the compositions of the present invention have substantially larger pot lires than comparable compositions utilizing promoters other than cerium.

TABLE F

| | Parts by weight | | | | | | | | | | | | | |
|---|---|---|---|---|---|---|---|---|---|---|---|---|---|---|
| Standard resin | 100 | 100 | 100 | 100 | 100 | 100 | 100 | 100 | 100 | 100 | 100 | 100 | 100 | 100 |
| Tertiary butyl peroxy benzoate | 1 | 1 | 1 | 1 | 1 | 1 | 1 | 1 | | | | | | |
| Tertiary butyl peroxy acetate | | | | | | | | | 2 | 2 | 2 | 2 | 2 | 2 |
| Cerium-2-ethyl hexanoate | 0.03 | | | | | | | | 0.03 | | | | | |
| Cerium acetyl acetonate | | 0.03 | | | | | | | | 0.03 | | | | |
| Cobalt-2-ethyl hexanoate | | | 0.03 | | | | | | | | 0.03 | | | |
| Manganese-2-ethyl hexanoate | | | | 0.03 | | | | | | | | 0.03 | | |
| Iron-2-ethyl hexanoate | | | | | 0.03 | | | | | | | | 0.03 | |

TABLE F-continued

| | Parts by weight | | | | | | | | | | | | |
|---|---|---|---|---|---|---|---|---|---|---|---|---|---|
| Copper-2-ethyl hexanoate | | | | | | | 0.03 | | | | | | 0.03 |
| Stability at 30° C. in days | 11 | 14 | 20 | 2 | 6 | 2 | 2 | 12 | 11 | 13 | 1 | 1 | 2 | 1 |

What is claimed is:

1. A process for the preparation of a curable molding or coating compound containing an unsaturated polyester resin consisting essentially of substantially uniformly incorporating into said resin effective amounts of a cerium promoter and a catalytically active peroxy ester selected from the group consisting of tertiary butyl peroxy esters of non-α-branched aliphatic monocarboxylic acids, tertiary butyl peroxy esters of non-α-branched aromatic monocarboxylic acids, tertiary butyl peroxy esters of non-α-branched aliphatic dicarboxylic acids, tertiary butyl peroxy esters of non-α-branched aromatic dicarboxylic acids, tertiary amyl peroxy esters of non-α-branched aliphatic monocarboxylic acids, tertiary amyl peroxy esters of non-α-branched aromatic monocarboxylic acids, tertiary amyl peroxy esters of non-α-branched aliphatic dicarboxylic acids, and tertiary amyl peroxy esters of non-α-branched aromatic dicarboxylic acids.

2. The process of claim 1, wherein the compound contains from about 0.1 to about 5%, by weight, of the peroxy ester, calculated on the unsaturated polyester resin.

3. The process of claim 1 or 2, wherein the peroxy ester is selected from the group consisting of teritary butyl peroxy benzoate, tertiary peroxy acetate, tertiary butylperoxy-3,5,5-trimethyl hexanoate, and di-tertiary butyl peroxy terephthalate.

4. The process of claim 1 or 2, wherein the cerium promoter is a cerium carboxylate.

5. The process of claim 1 or 2, wherein the cerium promoter is a cerium α-diketone.

6. The process of claim 5, wherein the cerium promoter is cerium acetyl acetonate.

7. The process of claim 1 or 2, wherein the cerium promoter is a salt or complex derived from a cerium-containing rare earth.

8. The process of claim 1 or 2, wherein the promoter is present in an amount of about 0.005 to about 0.25 parts of cerium, as metal, per 100 parts of unsaturated polyester resin.

9. A curable molding or coating compound consisting essentially of an unsaturated polyester resin having substantially uniformly incorporated therein effective amounts of a cerium promoter and a catalytically active peroxy ester selected from the group consisting of tertiary butyl peroxy esters of non-α-branched aliphatic monocarboxylic acids, tertiary butyl peroxy esters of non-α-branched aromatic monocarboxylic acids, tertiary butyl peroxy esters of non-α-branched aliphatic dicarboxylic acids, tertiary butyl peroxy esters of non-α-branched aromatic dicarboxylic acids, tertiary amyl peroxy esters of non-α-branched aliphatic monocarboxylic acids, tertiary amyl peroxy esters of non-α-branched aromatic moncarboxylic acids, tertiary amyl peroxy esters of non-α-branched aliphatic dicarboxylic acids, and tertiary amyl peroxy esters of non-α-branched aromatic dicarboxylic acids, and tertiary amyl peroxy esters of non-α-branched aromatic dicarboxylic acids.

10. A process for curing an unsaturated polyester consisting essentially of compressing and heating said resin to a temperature effective to cure the polyester, in the presence of effective amounts of a cerium promoter and a catalytically active peroxy ester selected from the group consisting of tertiary butyl peroxy esters of non-α-branched aliphatic monocarboxylic acids, tertiary butyl peroxy esters of non-α-branched aromatic monocarboxylic acids, tertiary butyl peroxy esters of non-α-branched aliphatic dicarboxylic acids, tertiary butyl peroxy esters of non-α-branched aromatic dicarboxylic acids, tertiary amyl peroxy esters of non-α-branched aliphatic monocarboxylic acids, tertiary amyl peroxy esters of non-α-branched aromatic monocarboxylic acids, tertiary amyl peroxy esters of non-α-branched aliphatic dicarboxylic acids, and tertiary amyl peroxy esters of non-α-branched aromatic dicarboxylic acids.

* * * * *